M. A. PERSONS & C. G. FARMER.
VALVE GRINDER.
APPLICATION FILED MAY 15, 1918.
1,301,165.
Patented Apr. 22, 1919.
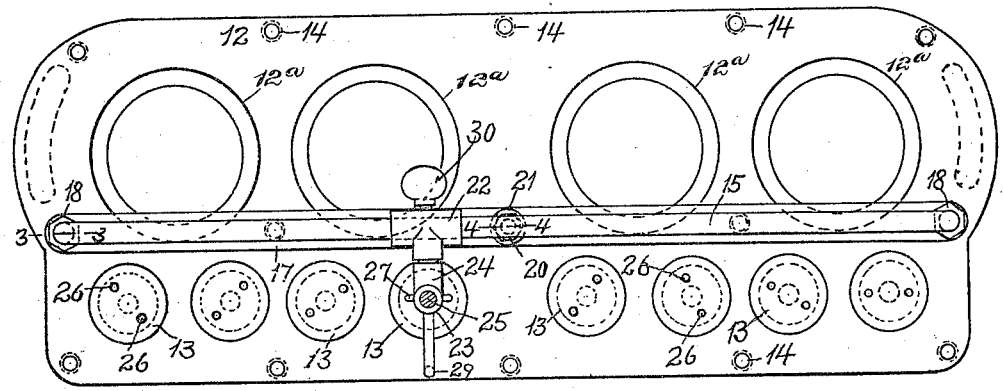
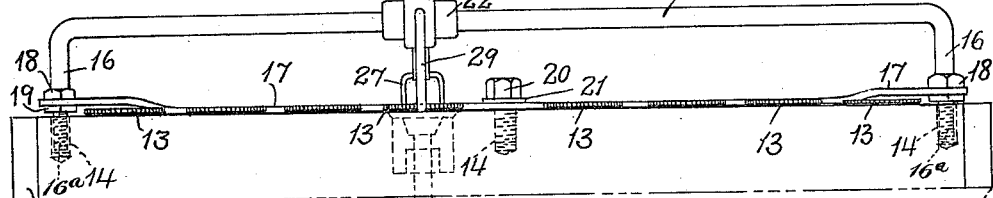
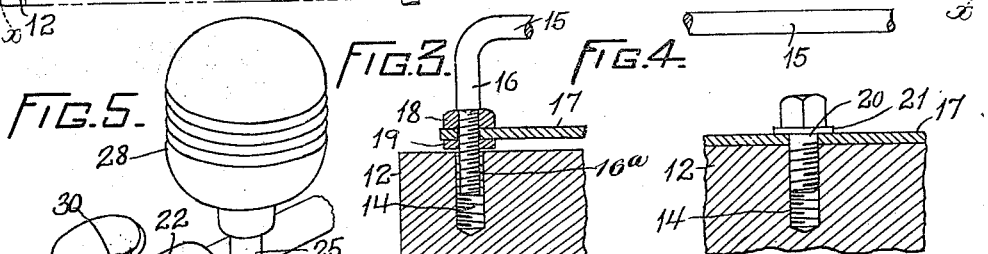
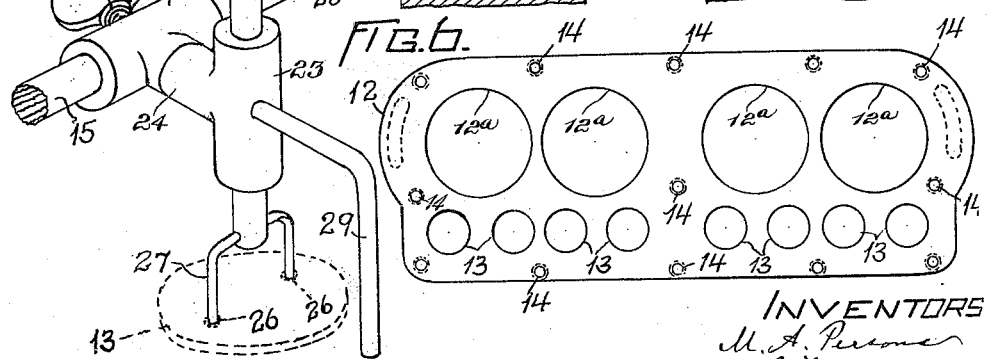

UNITED STATES PATENT OFFICE.

MARSHALL A. PERSONS AND CLARENCE G. FARMER, OF NEWPORT, NEW HAMPSHIRE.

VALVE-GRINDER.

1,301,165.  Specification of Letters Patent. Patented Apr. 22, 1919.

Application filed May 15, 1918. Serial No. 234,785.

*To all whom it may concern:*

Be it known that we, MARSHALL A. PERSONS and CLARENCE G. FARMER, citizens of the United States, residing at Newport, in the county of Sullivan and State of New Hampshire, have invented new and useful Improvements in Valve-Grinders, of which the following is a specification.

This invention relates to appliances for grinding valves of internal combustion engines for motor vehicles, by rotating the circular valve while in contact with its seat, the contacting surfaces of the valve and seat being thus conformed to each other.

The invention is embodied in an attachment comprising a guide having supporting means detachably engageable with the cylinder block or body, and adapted to support the guide spaced from the block and substantially parallel with a row of valves therein, the guide being unobstructed between said supporting means, a slide movable on said guide to either one of a plurality of operative positions relatively to said valves and provided with a spindle bearing, and a spindle rotatable and movable endwise in said bearing, and having means for separably engaging either of said valves to rotate the same. The slide is movable to locate the spindle in axial alinement with either valve, and the spindle is manually rotatable to cause it to rotate the valve with which it is engaged.

Of the accompanying drawings forming a part of this specification,—

Figure 1 is a top plan view of the cylinder block or body of a Ford engine, which is bored to form the usual cylinders, and is provided with an attachment embodying the invention, the usual removable plate forming a head for the cylinders and covering the valves, being removed.

Fig. 2 is an edge view of the upper portion of the cylinder block, the portion below the line $x$—$x$ being ommitted.

Fig. 3 is an enlarged fragmentary section on line 3—3 of Fig. 1.

Fig. 4 is an enlarged fragmentary section on line 4—4 of Fig. 1.

Fig. 5 is a perspective view illustrating the slide, the spindle bearing, and the spindle, and a portion of the guide.

Fig. 6 is a plan view of the cylinder block, on a smaller scale, illustrating the usual arrangement of tapped orifices or bolt holes formed therein to receive the bolts which secure the removable plate or cylinder head.

The same reference characters indicate the same parts in all of the figures.

In the drawings, 12 represents an engine body which is bored to form the usual cylinders $12^a$ and is herein called the cylinder block, the same being of well known form and construction, provided with the usual puppet valves 13, arranged in a straight row. The block is usually provided with a plurality of tapped orifices or bolt holes 14, to receive the bolts whereby the usual plate (not shown) covering the cylinders and valves, and herein referred to as the cylinder head, is detachably secured to the block. The attachment embodying our invention is applied to the cylinder block when the cylinder head is removed therefrom, the bolt holes 14 being therefore vacant. The construction of the attachment is such that some of the bolt holes 14 are utilized in securing the attachment in its operative position on the block, so that no change or adaptation of the block is necessary to permit the application of the attachment thereto. 15 represents a guide, which is preferably a stout cylindrical metal rod or bar having supporting standards detachably engageable with the block 12, and adapted to support the guide spaced from the block and substantially parallel with the row of valves 13, the guide being unobstructed between the supporting standards.

In the preferred embodiment of the invention here shown, the end portions of the rod or bar forming the guide 15, are bent to form upright standards 16. With the lower portions of these standards are engaged the end portions of a base 17, adapted to bear on the block 12, said base being preferably a flat sided metal bar, perforated at its ends to receive the standards 16 which may be screw-threaded, as shown by Fig.

3, and engaged with the end portions of the base by nuts 18 and 19, bearing on the upper and lower sides of the base. The lower ends of the standards 16 project below the base and constitute steady-pins 16ª adapted to loosely enter two of the bolt holes 14, and thus prevent the base from swinging horizontally on the holding-down bolt hereinafter described.

With the central portion of the base is engaged the holding-down bolt 20, the screw-threaded shank of which engages the internal thread of another bolt hole 14, as shown by Fig. 4, the head of the bolt bearing either directly on the base, or on a washer 21, and confining the base against upward movement.

22 represents a slide which is preferably tubular, and is adapted to freely move endwise on the unobstructed guide 15 and to occupy either one of a plurality of operative positions relatively to the valves. With the slide is connected a spindle bearing 23 arranged substantially at right angles with the axis of the slide. As here shown, the bearing 23 is rigidly connected with the slide by an arm 24.

25 represents a spindle adapted to rotate and move endwise in the bearing 23, and provided at its lower end with means for detachably engaging either of the valves 13, to cause rotation of said valve when the spindle is rotated. Each valve 13 is usually provided with a pair of sockets 26, adapted to receive a spanner, or similar tool. We therefore prefer to provide the spindle 25 with a fork 27, the branches of which are adapted to enter the holes 26 in the valve.

The spindle 25 may be manually rotated by a handle 28 attached to its upper end and arranged to be engaged by the palms of the two hands of the operator, who is enabled, by moving the hands simultaneously in opposite directions, to rapidly rotate the spindle forward and backward, the valve being similarly rotated and ground by contact with its seat. When one valve has been ground, the slide is moved to position to engage the spindle with another valve, and so on, until all the valves have been ground.

The bearing 23 is preferably provided with a foot 29, adapted to bear on the portion of the block outside the row of valves, and thus coöperate with the guide in firmly supporting the bearing.

The slide is preferably provided with a set screw 30, adapted to be set up against the guide 15 and confine the slide against movement on the guide.

After the valves have been ground, the attachment is removed from the cylinder block, and the cylinder head is restored to its operative position and secured by the usual bolts inserted in the orifices 14.

We claim:

1. A valve-grinding attachment, comprising a guide having supporting standards at its opposite ends detachably engageable with a cylinder block and adapted to support the guide spaced from the block and substantially parallel with a row of valves therein, the guide being unobstructed between said supporting standards, a slide movable on said guide to any one of a plurality of operative positions relatively to said valves and provided with a spindle bearing, and a spindle rotatable and movable endwise in said bearing and having means for separably engaging either of said valves to rotate the same.

2. A valve-grinding attachment, comprising a guide having standards at its opposite end portions, a base attached to said standards and formed to bear on a cylinder block beside a row of valves therein, a holding-down screw-threaded bolt engaged with the central portion of the base and adapted to engage a tapped orifice in the block, and steady-pins projecting downwardly from the end portions of the base and adapted to loosely enter other orifices in the block, and prevent the base from swinging on said holding-down bolt.

3. A valve-grinding attachment, comprising a guide having standards at its opposite end portions, a base attached to said standards and formed to bear on a cylinder block beside a row of valves therein, the lower ends of said standards projecting below the base and constituting steady-pins adapted to loosely enter orifices in the block, and a holding-down screw-threaded bolt engaged with the central portion of the base and adapted to engage the internal thread of another orifice in the block.

4. A valve-grinding attachment, comprising a guide having supporting means detachably engageable with a cylinder block and adapted to support the guide spaced from the block and substantially parallel with a row of valves therein, a slide adapted to move endwise on said guide, an arm on said slide having a spindle bearing arranged substantially at right angles with the axis of the slide, and a spindle rotatable and movable endwise in said bearing and having means for separably engaging either of said valves to rotate the same, the spindle bearing being provided with a foot adapted to bear on a portion of the block outside the row of valves.

5. A valve-grinding attachment, comprising a guide having supporting means detachably engageable with a cylinder block and adapted to support the guide spaced from the block and substantially parallel with a row of valves therein, a slide adapted to move endwise on said guide, an arm on said slide having a spindle bearing arranged substantially at right angles with the axis of the slide, and a spindle rotatable and movable endwise in said bearing and having means for separably engaging either of said valves to rotate the same, the spindle bearing being provided with a foot adapted to bear on a portion of the block outside the row of valves, and the slide being provided with a confining set screw to engage the guide.

In testimony whereof we have affixed our signatures.

MARSHALL A. PERSONS.
CLARENCE G. FARMER.